(12) United States Patent
Saada et al.

(10) Patent No.: US 9,090,352 B2
(45) Date of Patent: Jul. 28, 2015

(54) ULTRA LIGHTWEIGHT SEAT FOR AIRCRAFT

(75) Inventors: Benjamin Jacob Saada, Marseilles (FR); Jean-Charles Marcel Samuelian, Paris (FR); Vincent Tejedor, Sartrouville (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 13/979,424

(22) PCT Filed: Jan. 30, 2012

(86) PCT No.: PCT/EP2012/051441
§ 371 (c)(1),
(2), (4) Date: Jul. 12, 2013

(87) PCT Pub. No.: WO2012/104248
PCT Pub. Date: Aug. 9, 2012

(65) Prior Publication Data
US 2013/0307310 A1    Nov. 21, 2013

(30) Foreign Application Priority Data
Feb. 1, 2011  (FR) .................................. 11 00305

(51) Int. Cl.
*B64D 11/06* (2006.01)
*B60N 2/68* (2006.01)

(52) U.S. Cl.
CPC .............. *B64D 11/06* (2013.01); *B60N 2/686* (2013.01); *B64D 11/0649* (2014.12); *Y02T 50/46* (2013.01)

(58) Field of Classification Search
CPC ...... A47C 5/12; B64D 11/06; B64D 11/0649; B60N 2/686; Y02T 50/46

USPC .......................................... 297/452.2, 451.11
See application file for complete search history.

(56) References Cited

U.S. PATENT DOCUMENTS

| | | | |
|---|---|---|---|
| 3,719,389 A * | 3/1973 | Burton et al. ........ | 297/451.11 X |
| 7,540,568 B2 * | 6/2009 | Behrens et al. ............ | 297/452.2 |
| 7,753,443 B2 * | 7/2010 | Uchida ...................... | 297/452.2 |
| 8,016,361 B2 * | 9/2011 | Kismarton et al. ........ | 297/452.2 |
| 2003/0173815 A1 | 9/2003 | De Maina | |
| 2007/0267543 A1 * | 11/2007 | Boren et al. ........... | 244/118.5 X |
| 2008/0088166 A1 | 4/2008 | Gardiner | |

(Continued)

FOREIGN PATENT DOCUMENTS

| | | |
|---|---|---|
| EP | 0982180 A1 | 3/2000 |
| EP | 1946962 A2 | 7/2008 |
| FR | 1144425 A | 10/1957 |
| WO | 8502384 A1 | 6/1985 |

(Continued)

OTHER PUBLICATIONS

International Search Report for PCT/EP2012/051441 dated Dec. 5, 2012.

*Primary Examiner* — Anthony D Barfield
(74) *Attorney, Agent, or Firm* — Pearne & Gordon LLP

(57) ABSTRACT

The seat for an aircraft passenger is, in particular, very light. It consists principally of a structure (1), a back (2) and a base (3). The structure (1) is rigid and tubular. It may be obtained as a single piece by rotational moulding of a plastic or, alternatively, by extrusion-bending or bladder inflation moulding if the structure (1) consists of several tubes assembled with one another in rigid fashion.
Application to civil aircraft seats, in particular in economy class.

18 Claims, 3 Drawing Sheets

(56) References Cited

U.S. PATENT DOCUMENTS

Figure 1:
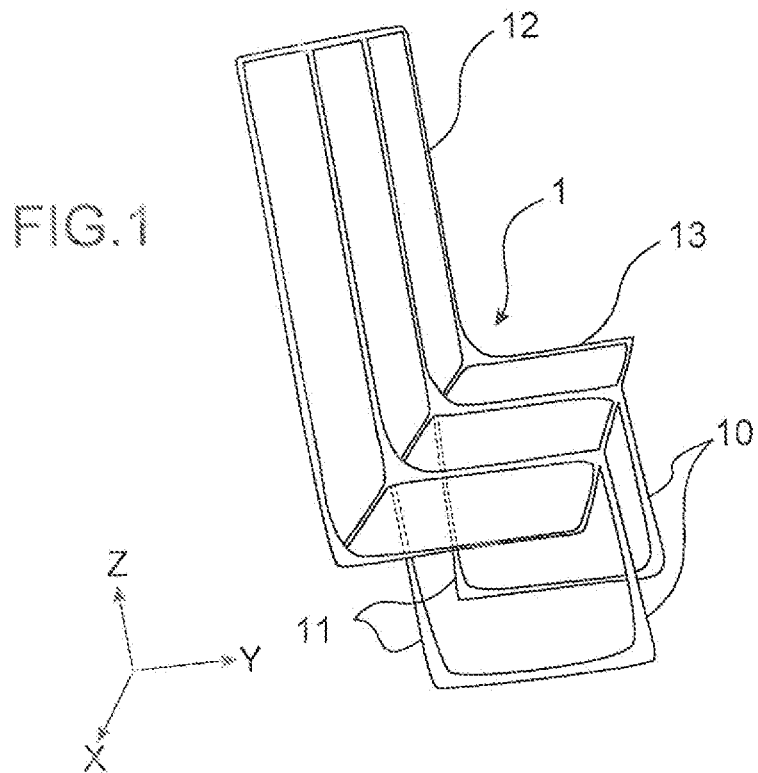

2008/0290715 A1  11/2008  Fullerton
2011/0163587 A1*  7/2011  Kmeid et al. .............. 297/452.2

FOREIGN PATENT DOCUMENTS

| WO | 2007136578 | A2 | 11/2007 |
| WO | 2010112875 | A2 | 10/2010 |

* cited by examiner

ULTRA LIGHTWEIGHT SEAT FOR AIRCRAFT

TECHNICAL FIELD

The present invention belongs to the field of manufacture of aircraft cabin fittings, for general aviation, commercial aviation or military aeroplanes. It relates more particularly to the production of a seat for an aircraft, supporting one or more passengers.

STATE OF THE PRIOR ART

Aircraft seats must satisfy particular standards, notably in terms of impact resistance. A dynamic crash resistance test, for example, subjects the seat to accelerations of 16 g in the aircraft's lengthways axis (axis Y in FIG. 1), 3 g in the perpendicular axis in the aircraft's horizontal plane (axis X in FIG. 1) and 14 g in the aircraft's vertical axis (axis Z of FIG. 1), where g is the acceleration due to gravity ($g \approx 9.81$ m·s$^{-2}$).

To address these constraints aircraft seats intended for passengers have been produced using a large number of parts, generally made of metal. These metal structures are relatively robust, and therefore give the seats great resistance in the event of impacts. But metal structures are dense, making the seats particularly heavy.

Traditional seats have a base and a back, generally produced using foam cushions positioned over a rigid metal portion. The rigid portion and the foam thicknesses contribute to increasing the weight of the seat.

In addition to the back and the base, the seat is fitted with multiple accessories, such as the safety belt, the elbow rests, folding trays, and display holders for magazines and safety instructions. Many of these accessories are fastened to the seat using metal structures. These accessories increase the weights of the seats still further.

The modern design of aircraft seats is intended to reduce the seat's weight, volume and complexity, whilst complying with the standards in force. Indeed, when the aircraft contains some one hundred seats, the seats may represent a significant proportion of the aircraft's total weight, and the volume they occupy cannot be exploited commercially.

Weight is an increasingly pressing problem in designing aircraft seats, both for economic reasons and for environmental reasons. A reduction of the unit weight of the seats leads to a reduction of the aircraft's total weight. The aircraft may thus reduce its fuel consumption, the size of its tank and the power of its engines, or conversely increase its range. From an environmental standpoint reducing the weight of the seats is very important: for a given aeroplane, it enables the quantity of fuel consumed to be reduced, and by this means enables discharges of carbon dioxide ($CO_2$) or nitrous oxides ($NO_x$) in the atmosphere to be reduced.

The volume of the seats is a second preoccupation, which seeks to respond to the ever greater passenger numbers transported each year. By reducing seats' unit volumes it is possible to reduce the space between two rows of seats, and to increase the number of passengers who may be seated within the aircraft or, conversely, to increase the space allotted to each passenger, or the space allotted to goods. By filling aircraft better, with a constant passenger flow in an air route, the number of flights may be reduced: the fuel thereby saved reduces greenhouse gas emissions commensurately.

The complexity of the seat raises several problems, during manufacture, maintenance, or in respect of the tracking of the different parts. The greater the number of parts comprising the aircraft seat, the more complex and costly the logistics and process of manufacturing the seat. The fastenings used to attach these different parts to one another are often metal (typically made of stainless steel), to satisfy the safety norms, and make the seat heavier. Reducing the number of parts thus enables the seat's volume and weight to be reduced.

In addition, historically these seats have directly incorporated expensive functions, in terms of weight and value, which are no longer suited to current cabin configurations: tilting of the seat back, for example, is no longer possible when the space between the rows of seats is small. Aircraft seats must adapt the comfort provided to the requirements of the airlines.

The base or back of aircraft seats include a cushion which may be difficult to clean. Adding a cushion to the aircraft seat increases the weight of the aeroplane, increases seat cleaning time between flights, and reduces hygiene on board the aircraft.

WO 8502384 describes an aeroplane seat structure consisting at minimum of two portions using carbon fibre and not steel, to reduce the weight of the seat without reducing its impact resistance. WO 2007136578 proposes to use composite materials, which are less expensive than carbon fibre, again with the aim of reducing the weight of the seat. Finally, WO 2010112875 proposes to reduce the number of fasteners in the structure of the seat by moulding a structure consisting of several parts made of composite materials.

The seats described in these patent documents seek to reduce the weight of the seat in an inexpensive manner, but still propose a seat implying the production or use of several parts, and not having a structure on which the passenger can sit directly.

Documents EP 0 982 180, EP 1 946 962 and US 2008/088166 are also cited, which represent the prior art relative to which the scope of the invention has been defined.

The present invention thus proposes a seat with a rigid structure of very low weight. The goals of this seat are to combine passenger comfort, notably the base and the back, and mechanical resistance, in order to comply with the standards in force for air transport of passengers. It is desired that the passenger may be able to sit directly on the seat without adding additional parts.

DESCRIPTION OF THE INVENTION

The present invention has been designed in the spirit of the problems mentioned above: simplification of the seat design, reduction of its weight and volume, and respect for the environment.

To this end, a first principal object of the invention is a seat for aircraft passengers including:
  a structure including feet attached to the floor of the aircraft, and an armature;
  at least one back, and
  at lease one base,
  where the at least one back and the at least one base are both securely attached to the armature of the structure.

According to the invention, the structure is rigid, of tubular design, and made of plastic.

A preferential embodiment of the invention provides that the plastic of the structure is a polyetherimide resin.

In a preferential embodiment of the seat according to the invention, the structure is reinforced with fibres consisting of a material of the group including carbon, glass and plant fibres.

In a first design of the seat, the structure is formed of a single piece.

In this case, one method of production of the structure according to the invention is rotational moulding.

In a second design according to the invention, the structure consists of several tubes attached to one another by joining parts.

In this latter case the joining parts are rigid bushings surrounding the ends of both tubes to be attached to one another. These bushings may be metal, or produced using composite materials.

In both cases the bushings may be produced by injection, either of metal, or of thermohardening matrix filled with fibres consisting of a material of the group including carbon, glass and plant fibres.

In this second design according to the invention, a method of production of the structure consists in using moulding by means of bladder inflation moulding, where the carbon fibres take the form of strands.

Another method of production of the structure according to the invention is extrusion/bending.

In a preferential embodiment of the seat according to the invention, the back and the base are thin, i.e. of the order of one millimetre thick, and fastened to the rigid structure.

In the method according to the invention, when rotational moulding is not used the back and the base are overmoulded on to the structure.

The seat according to the invention has several functions: dynamic resistance to impacts and to powerful accelerations, passenger comfort with the base and the back of the passenger, and support of various accessories (folding trays, magazine racks, elbow rests, etc.).

The seat's primary function is structural resistance. The seat according to the invention has a relatively simple structure: one way of increasing the seat's resistance is, indeed, to rigidify the structure by no longer allowing a mobile joint between the back and the base. By manufacturing the structure as a single rigid element stresses are able to be distributed throughout the entire seat, without any point of weakness relating to the mobile joint. The structural portion may thus be lightened.

The traditional point of weakness in the areas of the back/base angles are reinforced using arcs of a circle by means of elbowed rigid bushings, which are either metal or made of a composite material, or folded or rotationally moulded tubes, instead of using right angles. The forces are thus drained throughout the entire arc of the circle, instead of being concentrated in the angle. The structure of the seat according to the invention enables the collapse of the back to be limited, in the event of deceleration, impact or acceleration in the aircraft's lengthways axis, since it is directly connected through its feet to the aircraft's framework. By this means the forces drained by the angle between the back and base of the seat are limited.

The second function is the passenger's comfort and welcome. The back and base of the seat are portions which are directly in contact with the passenger, and which possibly may contribute nothing to the seat's structural resistance or, at the least, do so in limited fashion. Since the seat's structure consists of a single piece, the base and the back are rigidly attached to this structure, and can thus be considerably thinner, in order to minimise the seat's total weight. Since they are in direct contact with the passenger the base and back must be comfortable, easily washable and sufficiently rugged. They can be made easy to wash by using a covering made of water-repellent materials.

One option in producing the seat according to the invention consists in giving the base a rough texture. Indeed, if the material constituting the base is water-repellent and slippery there is a risk that the passenger will not adhere sufficiently to the seat and will be constantly propelled forward when the aircraft decelerates. To prevent this discomfort, grooves may be machined in the base in order to increase its roughness (grooves of the order of one millimetre wide and one tenth of a millimetre deep). The ridges of the grooves are blunted after machining to prevent risks of cutting the passenger.

The aircraft seat's final function is to attach various accessories, such as the safety belt, the elbow rests, the folding trays, the display holders of magazines or safety instructions. The technique of overmoulding may be used for these elements. The accessory is made using a very fine profile part or by thinning the material until thicknesses of the order of one millimetre are reached, and by then fastening them to the rigid structure.

In the case of articulated accessories, such as the folding tray or the elbow rest, only the rotary shaft must be attached to the structure, and the accessory is then attached to this rotary shaft, which must be as light as possible: a hollow and very thin support, located as close as possible to the structure, enables its weight to be limited, whilst limiting the leverage exerted by the accessory.

PRESENTATION OF THE FIGURES

FIG. 1: perspective view of the structure of the moulded single-element seat, according to the invention, and direct coordinate system used.

Figure 2:
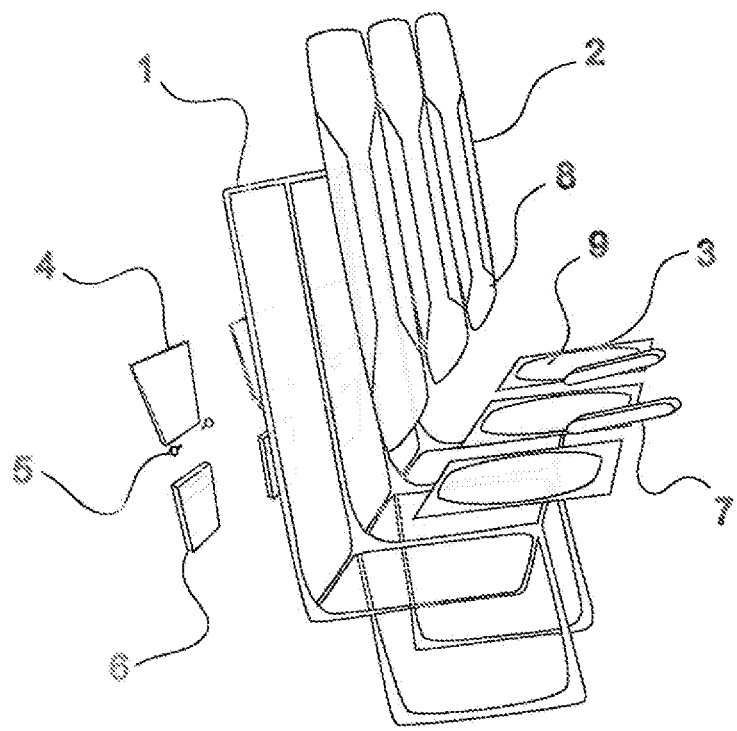

FIG. 2: exploded perspective view of a seat according to the invention with a moulded structure and its various overmoulded accessories.

Figure 3:
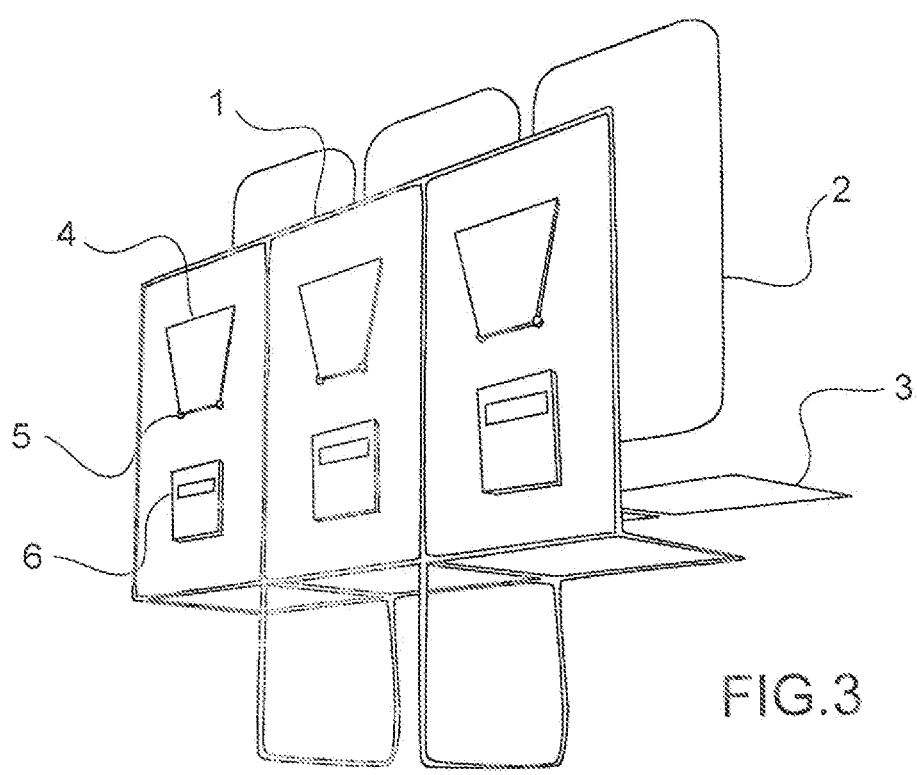

FIG. 3: exploded view of the back of the seat according to the invention of FIG. 2.

Figure 4:
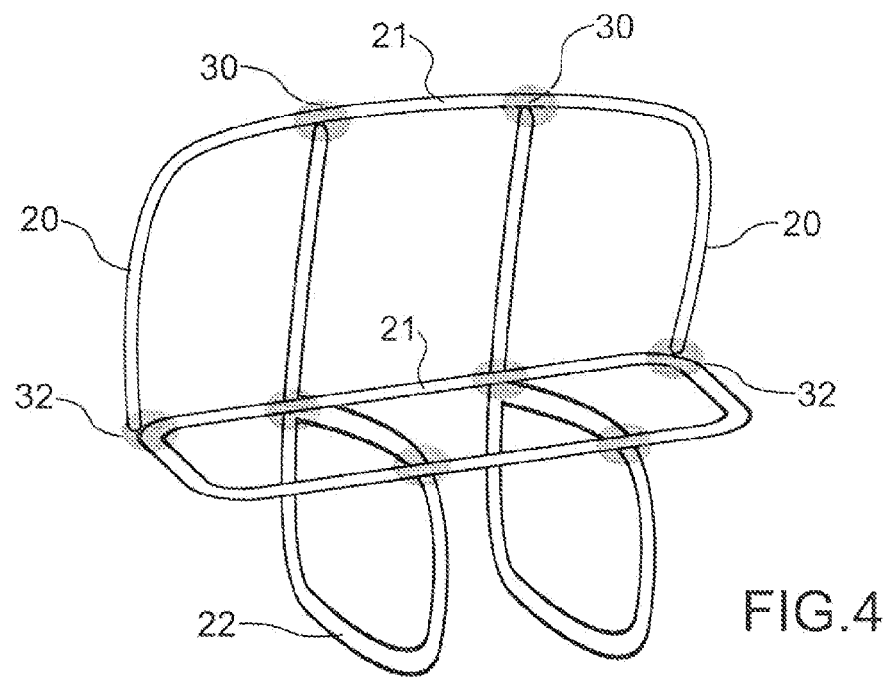

FIG. 4: the structure of the seat according to the invention in its embodiment with assembled tubes.

Figure 5A:
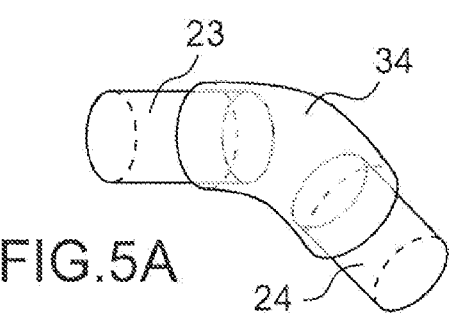
Figure 5B:
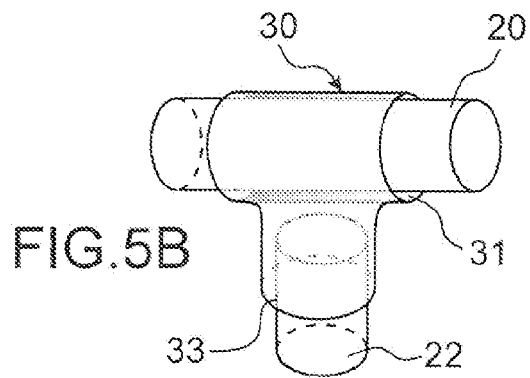

FIGS. 5A and 5B, two example embodiments of joining parts for production of the structure of the seat according to the invention with assembled tubes.

Figure 6:
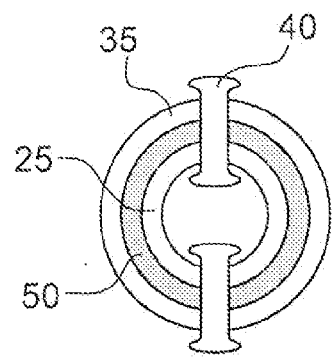

FIG. 6: section view of a join between two tubes with an optional sleeve.

DESCRIPTION OF INVENTION AND OF ITS MANUFACTURING METHODS

FIG. 1 shows an embodiment of structure 1 of the seat according to the invention, formed from a hollow tubular structure. The fastening points are located in the portion of the structure connected to the floor of the aircraft. All angles are rounded into arcs of a circle, even gentle arcs. The lower portions of forward vertical tubes 10 and rear vertical tubes 11 constitute the feet of the seat and are directly connected to its fastening point to the floor of the aircraft. The upper portion of rear vertical tubes 11 constitutes back section 12 of structure 1 of the seat. The armature is completed by a base portion 13. In this FIG. 1 a three-place seat has been represented, where only two front vertical uprights 10 and two rear vertical uprights 11 are required and where these are positioned either side of the middle seat. In this case the side seats are out of plumb.

The chosen material must comply with the standards in force in terms of toxicity, flammability and heat transmission. It is a plastic chosen from among the thermohardening polymers, such as epoxy resin, or the thermoplastic resins, such as a polyetherimide resin (PEI). If the material must be moulded a thermoplastic resin such as that of polyetherimide (PEI), for example, may be used, whether or not reinforced by fibres, which satisfies these constraints. The diameter of the tubes forming such a structure 1 is of the order of one centimetre, and the thickness of the tubes constituting it is of the order of several millimetres.

To manufacture such a structure 1 a first method according to the invention is rotational moulding. The polymer resin constituting the matrix of the material is ground to powder and placed within a mould. Short fibres, whether carbon and/or plastic and/or made of plants, such as hemp, may be added to the powder to reinforce the structure. The mould is then rotated around three axes of rotation forming a trihedron. The powder may be melted by heating, and then agglomerates on the edges of the mould in uniform fashion, possibly tightening the fibres within the matrix, and thus forming a hollow structure.

To increase the resistance of structure 1 further, certain portions must have no discontinuities: these portions are those located in the plane containing a vertical axis (Z) and the aircraft's lengthways axis (Y). One of these planes contains one of the tubular bars, for example rear vertical tube 11, connecting back section 12 to the fastening point of structure 1 to the floor of the aircraft. The rigidity of structure 1 relative to the aircraft's lengthways axis (Y) is crucial for the seat's properties, not least in the dynamic resistance tests.

FIG. 2 shows an example of a three-place seat according to the invention, in a slightly exploded manner. It also shows backs 2 and bases 3 which will be attached to structure 1. These portions are very thin and have grooved motifs enabling them to be made rougher. Backs 2 and bases 3 are preferably made from the same material as structure 1, for example polyetherimide resin, of the order of one millimetre thick. Initially these elements are cut again to obtain the desired shape, and then hot-shaped: a recess is made in back 2. The grooves or microgrooves are made by incision in base 3 to increase its roughness, and are then blunted by sanding. Backs 2 and bases 3 are attached to structure 1 by overmoulding of their edges.

An additional treatment may be accomplished in bases 3 and backs 2 by covering them with a softer material, such as water-repellent siliconised derivatives, in order to increase the seat's comfort. This surface treatment must be relatively thin, between a few millimetres and one centimetre thick, in order not to increase the seat's total weight excessively.

A recess 8, 9 may be made in the bottom of backs 2 and in the base, to obtain a comfortable and ergonomic seat.

The accessories are fastened in the same way to the seat by overmoulding. Initially the accessory is shaped from a profile made of polyetherimide or of siliconised derivatives, possibly surface-treated for more pleasant contact, and then attached to the seat by overmoulding. This applies to the magazine-holders 6 positioned in the back or rear section of backs 2, elbow rests 7 or for rotary shafts 5 of folding tables 4 positioned in the rear of the seat. Such a folding tray 4 may also be made of polyetherimide to achieve an additional weight reduction. The accessories may be attached in the initial step of manufacture of the elements constituting the seat in order that strips supporting these accessories are attached to the core of the structure constituting these elements.

FIG. 3 shows all these alignments constituting the seat, again in a slightly exploded manner.

Another method of manufacture of structure 1 of the seat is moulding by means of bladder inflation moulding. Such a method enables the moulded tubes to be strengthened by inserting a cylindrical composite strand, comprising a polymer matrix, such as a polyetherimide resin, and fibres, whether of carbon and/or plastic and/or of plants, such as hemp, in the mould. A bladder is positioned inside the strand and the entire assembly is placed in the mould. When the bladder has been inflated the mould is heated while the strand is pressed against the hot mould. The polymer resin of the strand melts and forms a matrix around the strengthening fibres. The matrix solidifies when the temperature of the mould is reduced. By this means a strengthened structure of the seat according to the invention may be manufactured.

A third method of production of such a structure is to use the extrusion-bending method, which results in an outcome similar to that of the method of bladder inflation moulding. In such a method the tube is extruded, i.e. the polymer resin is reduced to a state of paste, possibly filled with fibre, and stretched through a filter to obtain a motif which is that of the filter, repeated over a long length. This step is relatively conventional in the plastics industry to obtain long tube lengths. The second step, bending, consists in heating the tube locally in order to approach the glass transition temperature, and to soften the material. Twisting may then be applied using three pulleys, enabling the tube to be bent and shaped.

This method may also enable parts of the structure of the seat according to the invention to be manufactured, by manufacturing several tubes for a single seat, some being more or less straight, others being bent.

FIG. 4 shows an example embodiment of the structure of the seat according to the invention with the assembly of several tubes 20, 21 and 22. They are assembled by joining parts 30, 32. Tubes 20 are bent, i.e. folded, for example using the above extrusion-bending method. Tubes 21 are straighter, whereas tubes 22, constituting the feet of the structure, are bent in three places. Joining parts 30 and 32 can have different configurations, depending on the assemblies to be produced. Joining parts 30 produce an assembly of two tubes in a given plane. Such a joining part is represented in detail in FIG. 5B. It therefore connects a relatively straight tube 20 constituting the upper central portion of the three seats to a vertical tube 22 constituting the back section of the side seats. A perpendicular portion 33 is connected to a main connection 31. Both portions 31 and 33 of such a double joining part 30 tighten the end of free tube 22 and encircle a more or less central portion of other tube 20.

With reference to FIG. 5A, simple joining parts 34 which connect only two tubes 23 and 24 to one another, but which are elbowed, may be produced.

All these joining parts are preferably made of metal and are therefore denser than the tubes which they connect. Alternatively they may be made of a composite material, like the structure. In both cases the bushings may be produced by injection, either of metal, or of thermohardening matrix filled with fibres consisting of a material of the group including carbon, glass and plant fibres. The joins obtained in this manner enable the vibrations from the floor to be absorbed, and reduce passenger discomfort. It should be noted that the mechanical resistance of the join will be greater the greater the overlap area between the tubes and these joining parts.

With reference to FIG. 6, the attachment between the tubes and the joining parts may be either mechanical, using a screw or a rivet traversing the tube and the joining part in the area of the overlap, or chemical, using an adhesive in the overlap.

A dampening element may be inserted in the middle of the join. It may consist of a polyurethane foam sleeve 50, inserted between tube 25 and joining part 35. The attachment is always made between joining part 35 and tubes 25, for example by means of a screw or a rivet 40 which traverses the three elements. Chemical fixing may also be used.

The aircraft seat according to the invention thus allows great weight savings, due to the low density of the entire structure compared to a conventional structure. It is intended in particular for civil air transport in economy class.

What is claimed is:

1. A seat for aircraft passengers including:
a structure including a back section, a base portion, and feet adapted to be attached to a floor of an aircraft;
at least one back, and
at least one base,
wherein the at least one back is attached to the back section of the structure, the at least one base is attached to the base portion of the structure, and the feet are attached to the base portion of the structure,
wherein the back section and the base portion are formed of rigid plastic tubes attached to one another by joining parts comprising rigid bushings, at least one of the rigid bushings connecting at least two rigid plastic tubes together,
wherein a first of the at least two rigid plastic tubes comprises an end that terminates inside the at least one of the rigid bushings, and
wherein a second of the at least two rigid plastic tubes comprises a portion that extends inside and is encircled by the at least one of the rigid bushings.

2. The seat according to claim 1, wherein the plastic is a thermoplastic polymer.

3. The seat according to claim 2, wherein the structure is strengthened with fibres of a material selected from the group consisting of carbon, glass and plants.

4. The seat according to claim 2, wherein the thermoplastic polymer comprises polyetherimide resin.

5. The seat according to claim 1, wherein the plastic is a thermohardening polymer.

6. The seat according to claim 5, wherein the structure is strengthened with fibres of a material selected from the group consisting of carbon, glass and plants.

7. The seat according to claim 5, wherein the thermohardening polymer comprises epoxy resin.

8. The seat according to claim 1, wherein the structure is strengthened with fibres of a material selected from the group consisting of carbon, glass and plants.

9. The seat according to claim 8, wherein the structure is produced by bladder inflation moulding, and wherein the plastic is strengthened with fibres of a material selected from the group consisting of carbon, glass and plants.

10. The seat according to claim 9, wherein the at least one back and the at least one base are overmoulded on to the structure.

11. The seat according to claim 8, wherein the structure is produced by extrusion/bending.

12. The seat according to claim 11, wherein the at least one back and the at least one base are overmoulded on to the structure.

13. The seat according to claim 1, wherein the joining parts comprise metal bushings.

14. The seat according to claim 13, wherein the metal bushings are produced by injection of metal.

15. The seat according to claim 1, wherein the joining parts comprise bushings made of composite material.

16. The seat according to claim 15, wherein the bushings made of composite material are produced by injection of a thermohardening matrix filled with fibres of a material selected from the group consisting of carbon, glass and plant fibres.

17. The seat according to claim 1, wherein at least one of the at least one back and the at least one base are thin, of the order of one millimetre thick.

18. The seat according to claim 1, wherein the feet are formed of rigid plastic tubes and are attached to the base portion by joining parts comprising rigid bushings surrounding at least an end of the tubes to be attached.

* * * * *